United States Patent [19]
Taylor et al.

[11] Patent Number: 5,111,038
[45] Date of Patent: May 5, 1992

[54] ACOUSTO-OPTIC TUNABLE FILTER APPARATUS AND METHOD FOR DETECTING AND IDENTIFYING AN OPTICAL RADIATION SOURCE.

[75] Inventors: Lyle H. Taylor, Murrysville; Nathan T. Melamed, Pittsburgh; Milton S. Gottlieb, Churchill, all of Pa.

[73] Assignee: Westinghouse Electric Corp., Pittsburgh, Pa.

[21] Appl. No.: 654,170

[22] Filed: Feb. 12, 1991

[51] Int. Cl.$^5$ .............................................. G02F 1/11
[52] U.S. Cl. ..................... 250/225; 356/73; 356/121; 356/364; 250/339
[58] Field of Search ...................... 250/225, 339, 203.3, 250/203.6; 356/364, 121, 71, 141, 152

[56] References Cited

U.S. PATENT DOCUMENTS

| | | | |
|---|---|---|---|
| 4,115,006 | 9/1978 | Reymond et al. | 356/152 |
| 4,519,707 | 5/1985 | Kuffer | 250/339 |
| 4,575,186 | 3/1986 | Gottlieb et al. | 350/358 |
| 4,644,267 | 2/1987 | Tsui et al. | 350/356 |
| 4,653,869 | 3/1987 | Gottlieb et al. | 350/372 |
| 4,682,024 | 6/1987 | Halldorsson et al. | 250/225 |

FOREIGN PATENT DOCUMENTS

| | | | |
|---|---|---|---|
| 215533 | 9/1986 | Japan | 350/358 |
| 667940 | 6/1979 | U.S.S.R. | 350/358 |

*Primary Examiner*—Carolyn E. Fields
*Attorney, Agent, or Firm*—W. G. Sutcliff

[57] ABSTRACT

A source of broad-band and/or narrow band optical radiation is detected and identified by apparatus including a pair of acousto-optical tunable filters which diffract from orthogonally polarized components of the optical radiation, a diffracted ordinary polarized beam and diffracted extraordinary beam, respectively. Undiffracted polarized radiation from the two AOTFs is combined and directed to a first detector which may comprise a small array such as a quadrant array. The diffracted ordinary and extraordinary polarized beams are directed to a second detector which is preferably a single large imaging array. A signal processor uses signals from the first detector generated by the undiffracted beams to detect the presence of the source, and polarized spectral signals from the large imaging array to identify the source of the radiation. A control unit generates radio frequency signals which can be rapidly varied in frequency to control wavelength of the polarized beams diffracted by the AOTFs. These radio frequency (rf) signals may be applied simultaneously, with or without amplitude modulation, or sequentially, to the AOTFs, and may be of the same or different frequencies. The rf drive may be withheld from the AOTFs to maximize the undiffracted beams for maximum range detection.

26 Claims, 3 Drawing Sheets

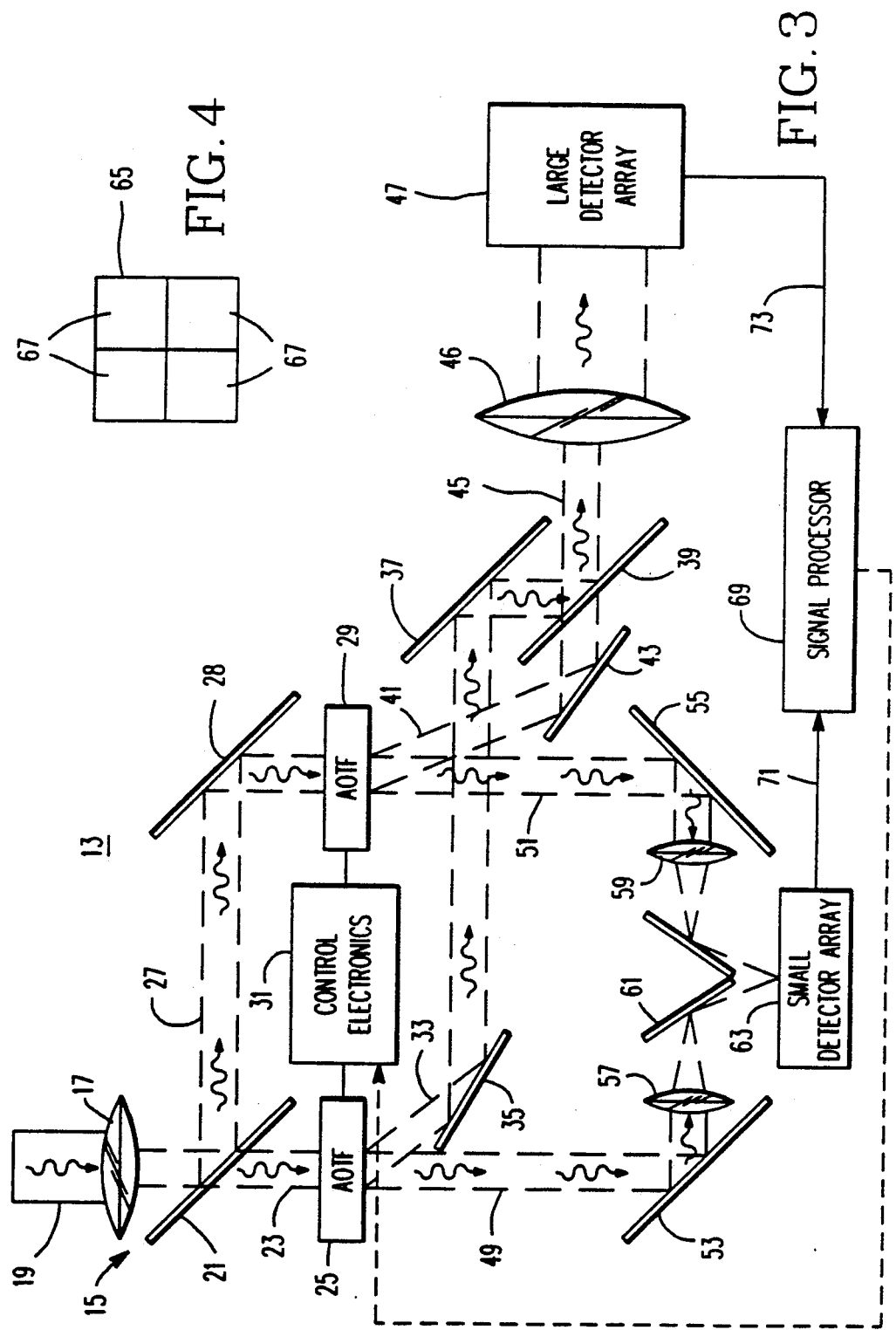

ACOUSTO-OPTIC TUNABLE FILTER APPARATUS AND METHOD FOR DETECTING AND IDENTIFYING AN OPTICAL RADIATION SOURCE.

BACKGROUND

1. Field of the Invention

This invention relates to apparatus and a method utilizing acousto-optic tunable filters for detecting the presence of an optical radiation source and for identifying that source, and has particular application in a threat warning system.

2. Background Information

An important problem for military defense is the need to distinguish re-entry vehicle warheads from decoys and space debris, or enemy aircraft from friendly aircraft (or missiles), or enemy ground vehicles from the background. The problem is made difficult by the short time normally available form making the distinction, by the small size of the targets, or threats, and often by large amounts of clutter. It is made even more difficult by the need to detect the threat at as large a distance as possible and to identify it as quickly as possible after detection.

In conventional optical receivers, an image is recorded at a small number of discrete wavelengths which are fixed, i.e., cannot be changed during receiver usage. These receivers either record these wavelengths simultaneously on separate detectors or record them sequentially at a relatively slow rate. Furthermore, no polarization information on the image is obtained, and the same detectors are used for both target detection and target identification. The latter limitation means that the system cannot be optimized for both target detection and target identification.

Commonly owned U.S. patent application Ser. No. 07/597,457 filed on Oct. 12, 1990 suggests the use of an acousto-optic tunable filter (AOTF) for detecting and analyzing a source of optical radiation. AOTF's are crystals which utilize acoustic power to manipulate an optical beam. For a given acoustical frequency, only one wavelength of the incident light is diffracted; all other wavelengths pass through undiffracted. The referenced application utilizes a birefringent AOTF to diffract from the incident optical radiation orthogonally polarized ordinary and extraordinary diffracted beams having a narrow bandwidth determined by the frequency of the applied radio frequency acoustic signal. The diffracted ordinary and extraordinary polarized beams are directed to separate detector arrays for spectral and polarization analysis. The bulk of the incident radiation which is undiffracted is directed to another detector array which is used for broadband detection and possibly recognition of the source. The outputs of the detectors for the diffracted ordinary and extraordinary polarized beams may be subtracted to determine the polarization of the incident light or may be added for maximum signal strength at the selected wavelength.

While the apparatus described in the referenced application has many advantages, such as, the ability to perform spectral, polarization, and broad beam analysis simultaneously, and the agility to perform the spectral analysis in real time, it is an object of the present invention to provide improved apparatus for detecting and identifying a source of radiation.

It is also an object of the present invention to provide such apparatus with a greatly improved signal to noise ratio.

It is another object to provide such improved apparatus which permits spectral analysis at two frequencies simultaneously.

It is yet another object of the invention to provide such an apparatus which permits polarization analysis using a single detector.

It is an additional object of the invention to provide such improved apparatus which has improved capability for long range detection of the radiation source.

SUMMARY OF THE INVENTION

These and other objects are realized by the invention which is directed to apparatus and a method for detecting and identifying a source of broad-band and for narrow-band optical radiation which includes optical input means generating from incident optical radiation emitted by the source, first and second orthogonally polarized input beams. One polarized input beam is applied to a first acousto-optic tunable filter (AOTF) as an ordinary wave which is separated into a diffracted extraordinary polarized beam and a first broad-band undiffracted beam. The second polarized input beam is applied to a second AOTF as an extraordinary wave which is separated into a diffracted ordinary polarized beam and a second broad-band undiffracted beam. A first detector means generates first detector signals from the first and second broad-band undiffracted beams while second detector means generates second detector signals from the diffracted ordinary and extraordinary beams. The wavelengths of the diffracted ordinary and extraordinary polarized beams are controlled by control means which generates first and second radio frequency signals applied to the AOTFs. A signal processor processes the first detector signals generated from the undiffracted beams to detect the presence of the source of optical radiation, and processes the second detector signals derived from the diffracted ordinary and extraordinary polarized beams to identify the source.

Preferably, the second detector means is a single imaging detector array on which both the diffracted ordinary polarized beam and diffracted extraordinary polarized beam are focused. The control means can apply radio frequencies to both AOTFs simultaneously or sequentially. With the radio frequency signals applied simultaneously, the signal to noise ratio of the second detector output is increased by about a factor of two relative to sequential operation as the optical input is increased while the detector noise remains the same. Sequential diffraction of the polarized beams provides the capability of analyzing the polarization of the selected narrow band of the incident radiation. Alternatively, the two AOTFs can be driven simultaneously by rf signals of different frequencies.

As another aspect of the invention, the radio frequency signals driving the two AOTFs can be of the same frequency, but amplitude modulated at different frequencies. The detector signal generated by the single imaging detector array is demodulated to extract the two polarization components.

For initial identification of weak sources, or sources at great distances, no rf signals are applied to either AOTF so that all of the incident light beam is undiffracted and impinges upon the first detector. This first detector may be a point detector or preferably a small array, such as, for instance, a quadrant array. The second detector is one or two large imaging arrays which offers the capability of angle position and shape analysis available with prior art systems as well as agile spectral and polar imagery analysis.

BRIEF DESCRIPTION OF THE DRAWINGS

A full understanding of the invention can be gained from the following description of the preferred embodiments when read in conjunction with the accompanying drawings in which:

FIG. 3 is a schematic diagram of apparatus in accordance with a first embodiment of the invention.

FIG. 4 is a schematic diagram of a quadrant array which can be used in the apparatus of FIG. 3.

DESCRIPTION OF THE PREFERRED EMBODIMENTS

Figure 1:
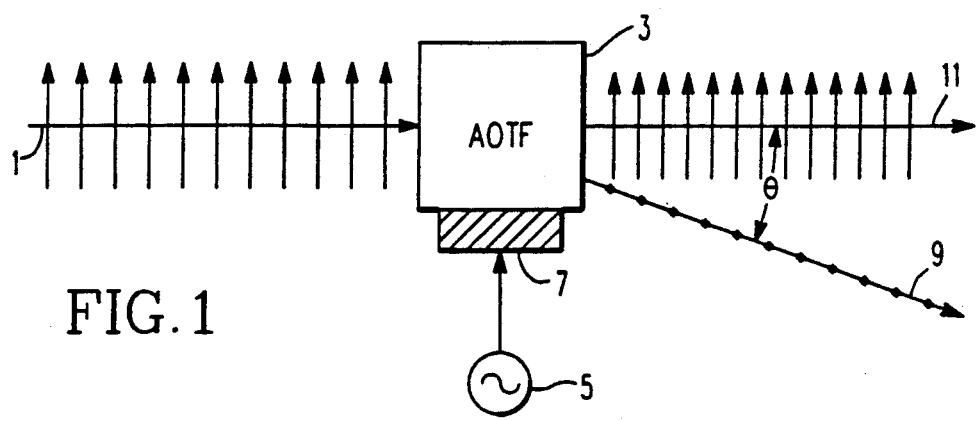
FIG. 1 is a schematic diagram illustrating conceptually the operation of the acousto-optic tunable filter used in the invention.

The present invention is directed to an apparatus which utilizes a pair of acousto-optic tunable filters for simultaneous broad-band and/or narrow-band, spectral and polarization analysis of radiation emitted by a source of optical radiation.

To understand the operation of AOTF-containing seeker systems, it is important to understand the basic operation of the AOTFs. Acousto-optic devices use acoustic power to manipulate the optical beam. The acoustic wave establishes a phase grating within the material which causes the entering light beam to be diffracted. By varying the applied acoustic frequency, the grating spacing is varied, thereby manipulating the optical beam. Cells of this type are referred to as Bragg cells, and may differ according to the type of material used. Materials whose indices of refraction are isotropic are referred to as normal, or isotropic, Bragg cells, whereas birefringent materials can produce anisotropic Bragg cells.

In a normal Bragg cell, the angle of incidence is equal to the angle of diffraction. Changing the diffraction angle—for example, by changing the grating spacing—requires an equal change in the incident angle relative to the acoustic wavefront. Hence, either the input beam direction or the acoustic wavefront must be steered to maintain the phase matching condition—that is, to conserve momentum.

In an anisotropic Bragg cell, the input angle remains essentially fixed over a wide range of acoustic frequencies around the design center, and the optical beam can undergo considerable manipulation with little change in the input and output beam directions. Furthermore, light entering with one polarization is diffracted into the opposite polarization. Thus, anisotropic Bragg cells are polarization sensitive.

There are generally two types of anisotropic AOTFs: collinear and non-collinear. In the collinear filter, the acoustic wave and the optical beam travel along the same path, with the optical beam incident normal to the acoustic wavefront. This means, in general, that the input and output optical beams also travel along the same path. Because the sense of polarization of the output beam is rotated by 90 degrees relative to the input beam, the two beams are usually separated by a polarizing beam splitter or similar device. In the noncollinear filter, the light is incident at some large angle to the acoustic wavefront and diffraction occurs for the optical wavelength for which the phase matching conditions are satisfied.

There are many features that make the noncollinear filter more desirable than the collinear filter. The design of a collinear filter is fixed, except for the choice of material, and the need for a polarizing beam splitter complicates its use. Conversely, the non-collinear filter lends itself to a wide range of design variations, providing greater flexibility and satisfying many more applications. Also, the spatial separation of the diffracted and undiffracted beams can eliminate the requirement for polarizers in many cases, and, if they are required, they are much easier to incorporate.

Although all of these filters can be used in this invention, the birefringent non-collinear filter will be assumed in the description given below. However, all of these filters have the advantages common to all AOTF devices: agility, high speed of response, random accessibility, and all-electronic control. Furthermore, the bandwidth of their diffracted beams can be quite narrow or fairly large, from roughly 0.01% to 10% of the center wavelength. Actually, it is the bandwidth in wavenumbers which is constant across the transmission range of the AOTF. However, once designed into the AOTF, the bandwidth cannot be changed.

To see how a non-collinear AOTF would typically operate in an optical receiver, consider a beam 1 of polarized white light entering the crystal 3 as shown in FIG. 1. A radio frequency driver 5 supplies an rf signal of a selected frequency to a transducer 7 which in turn applies an acoustic signal of the selected rf frequency to the crystal 3 transversely to the incident optical beam 1.

Figure 2A:
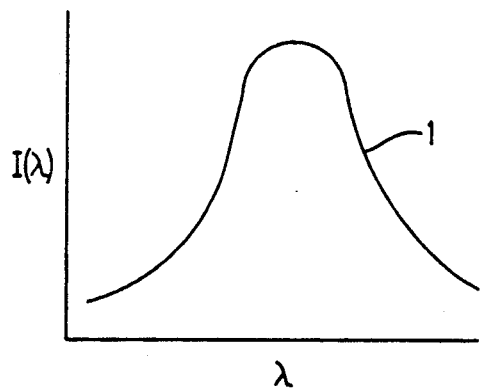
FIG. 2a is a plot of the wavelength spectrum incident on the acousto-optic filter of FIG. 1.
Figure 2C:
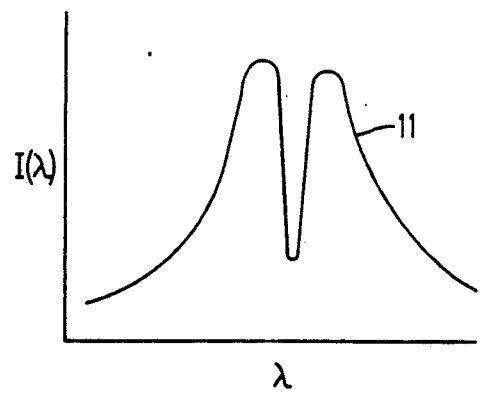
FIG. 2b is a plot of the undiffracted portion of this incident beam and FIG. 2c is a plot of the diffracted portion of the beam.
Figure 2B:
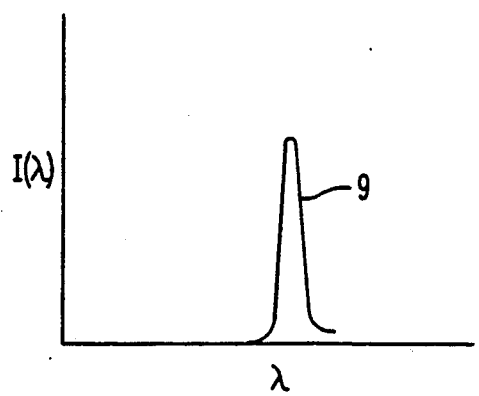

FIG. 2a is a plot of the wavelength spectrum incident on the crystal 3; FIGS. 2b and 2c are plots of the diffracted and undiffracted portions.

For a given acoustic frequency, only one wavelength of the incident light beam 1 satisfies the phase matching conditions, and is diffracted; all other wavelengths pass through undiffracted. Because the diffracted beam 9 leaves the crystal at a deviated angle $\theta$, it is spatially separated from the undiffracted light 11. Detectors (not shown in FIG. 1) placed at the focus of the diffracted beam 9 will see only that wavelength which is selected by the applied acoustic frequency. Conversely, detectors (also not shown in FIG. 1) placed at the focus of the undiffracted beam 11 will see all other wavelengths within the transmission bandwidth of the AOTF crystal. Since diffraction efficiencies depend on the rf beam intensity and are nominally 80-85%, the undiffracted beam 11 will also contain some radiation at the diffracted wavelength. The speed at which the diffracted wavelength can be changed is simply the time required for a new rf wave to travel across the crystal 3, nominally a few microseconds per cm.

The key features of AOTFs which make them so useful are:

the diffracted wavelength depends on the rf wavelength the diffracted beam intensity depends on the rf beam intensity the diffracted and undiffracted beams are physically separated the diffracted wavelength can be rapidly changed to any value It is these four features, as well as the polarization sensitivity, of AOTFs which form the basis of the system described below.

Passive or active imaging systems are particularly useful in identifying threats when the image of the threat encompasses enough pixels that the shape of the threat can be determined. However, much information can be obtained from an examination of single pixels—both when the entire image is contained within the single pixel and when only a small facet of the image is contained within the single pixel. A well designed receiver should handle both single pixel and multiple pixel information equally well.

The acousto-optic receiver design described herein satisfies this requirement by detecting moving threats at large distances with a small detector array, while producing polarization-dependent spectral images at closure distances with a large detector array. This receiver should be particularly effective at detecting threats at large distances and at identifying those threats at closer distances.

The spectral, polarization and broad beam analysis system of the invention is based on the special features of AOTFs. The basic configuration of one embodiment of the invention is shown schematically in FIG. 3 for an infrared receiver 13. While the infrared region is shown as an example, the invention is not limited to any particular optical region. An input section 15 of the IR receiver 13 includes receiving optics 17 which gather radiation 19 from the field of view, and transmit it through a polarizing beam splitter 21 which sends one polarization 23 to one AOTF 25 and the orthogonal polarization 27 to another AOTF 29. The AOTF 25 is oriented such that the polarized beam 23 is incident as an extraordinary wave, while the AOTF 29 is oriented so that the second polarized beam 27 is incident as an ordinary wave. Thus, the two AOTFs 25 and 29 each operate on a single linear polarization component of the incident beam 1.

The AOTFs 25 and 29 are activated by an rf wave provided by control electronics 31. Each AOTF diffracts into a beam a few degrees off-axis, a narrow wavelength region centered about an optical frequency determined by the rf frequency, and transmits all other wavelengths on-axis. The diffracted ordinary polarized beam 33 output from the AOTF 25, is reflected by turning mirrors 35 and 37 and recombined at beam splitter 39 with the diffracted extraordinary polarized beam 41 output by the AOTF 29 and reflected by mirror 43 into the beam splitter 39. The recombined beam 45 is focused onto a large detector array 47. On the other hand, the undiffracted beams 49 from the AOTF 25 and 51 from the AOTF 29 are reflected by turning mirrors 53 and 55 and focused by focusing optics 57 and 59 respectively, onto turning mirrors 61 which direct the beams through a dichroic filter (not shown) which divides the undiffracted beams 49 and 51 into two wavelength regions with each wavelength region being focused onto a separate small detector array 63. The small detector arrays 63 are used for target detection. They could be single point detectors, although quadrant detectors would probably be used to provide some directional information about the targets. Such a quadrant array 65 shown in FIG. 4 has four detector elements 67. Although AOTFs normally transmit a large range of wavelengths, detectors do not normally cover such a broad range. Hence, the dichroic filter is used to optimize the detection of hot targets (e.g., a 1.5 μm beam) and cold targets (e.g., a 15 μm beam). If the system was to be used for detecting targets with a narrower bandwidth of radiation, or a detector array 63 was available for the full range of wavelengths to be detected, the dichroic filter would not be required and the two undiffracted beams 49 and 51 could be focused onto a single small detector array 63.

A signal processor 69 receives the detector signal 71 generated by the small detector array 63 and the signal 73 generated by the large detector arrays 47. The signal processor 69 analyzes the detector signals to detect and identify the source of the incident radiation 1 (which is not normally 100% polarized). The signal processor 69 also controls the control electronics 31.

When rf is not provided by the control electronics 31 to the AOTFs 25 and 29, all radiation 1 incident on the input optics 17 is directed to the small detector arrays 63 thereby maximizing the signal to noise ratio, and hence the probability of target detection.

The large detector array 47 is used for target identification. It can be either a staring array or a scanning array optimized for the identification of the target. This array 47 would normally be utilized by the signal processor 69 when the target range was sufficiently short that images could be formed which encompassed several pixels.

The easy and fast control of the AOTFs 25 and 29 through their individual rf drives, provides great flexibility for the IR receiver 13. For example, consider this typical scenario involving several targets coming toward the receiver 13. The rf is turned off when the targets are at long ranges to maximize the detection probability, but once the signal at one of the small detector arrays 63 exceeds a threshold value, the signal processor 69 signals the control electronics 31 to turn on the rf, and images of the targets are formed on the large detector array 47.

In one mode of operation, the AOTFs 25 and 29 would at first be operated simultaneously to maximize the signal to noise ratio in the large detector array. This signal to noise ratio using the one large detector array 47 would be about one and half times the signal to noise ratio for a system utilizing separate large detector arrays for each polarization, since the signal strength is doubled and the detector noise remains the same. The wavelength would be rapidly changed to determine any significant spectral signatures and/or to determine the black body temperatures of the targets by two or three color pyrometry. As the targets became closer the AOTFs 25 and 29 would be operated sequentially while continuing to obtain spectral data. The signal processor 69 would difference each pair of images thereby significantly reducing clutter since background radiation should be more unpolarized than radiation reflected from or emitted by the objects. The signal processor 69 would also measure any cyclical variations in the signal intensity of both polarizations; this cyclical variation may correlate with the roll or spin rates of the targets. In addition to imaging, differencing sequential operation would allow any polarization-dependent effects in the target signatures to be measured. With all this information, in addition to tracking information and the information available from the small detector arrays, quick target identification should be possible.

In a second mode of operation, instead of operating the AOTFs 25 and 29 sequentially to obtain polarization information, both AOTFs could be operated simultaneously, and with the same rf frequency, but with the two rf frequencies modulated by different amplitude modulation frequencies. The signal processor 69 would then demodulate the signals from the detector array 47 to extract the polarization information. In another variation, the AOTFs 25 and 29 could be driven with different rf frequencies to more rapidly analyze the spectral signature of the target.

In addition to the above modes of operation, consider the incidence of very intense optical radiation 1 which could damage the detectors 47 and 63. As soon as this radiation were detected, the rf could be shut off by the control electronics 31, thereby preventing radiation from reaching the delicate large detector array 47. Since the radiation is focused to a small spot size on the small detector array 63, plasma breakdown switches could be used to protect the small arrays. Once the radiation intensity was too weak to damage the arrays 47 and 63, the system could be operated normally.

An important advantage of separating the detection and identification processes is that the large amount of signal processing associated with a large array is not needed until the signal to noise ratio is sufficiently high. Furthermore, while the large detector array 47 is concentrating on target identification, the small detector array 63 could still be locating additional targets at longer ranges.

Figure 5:
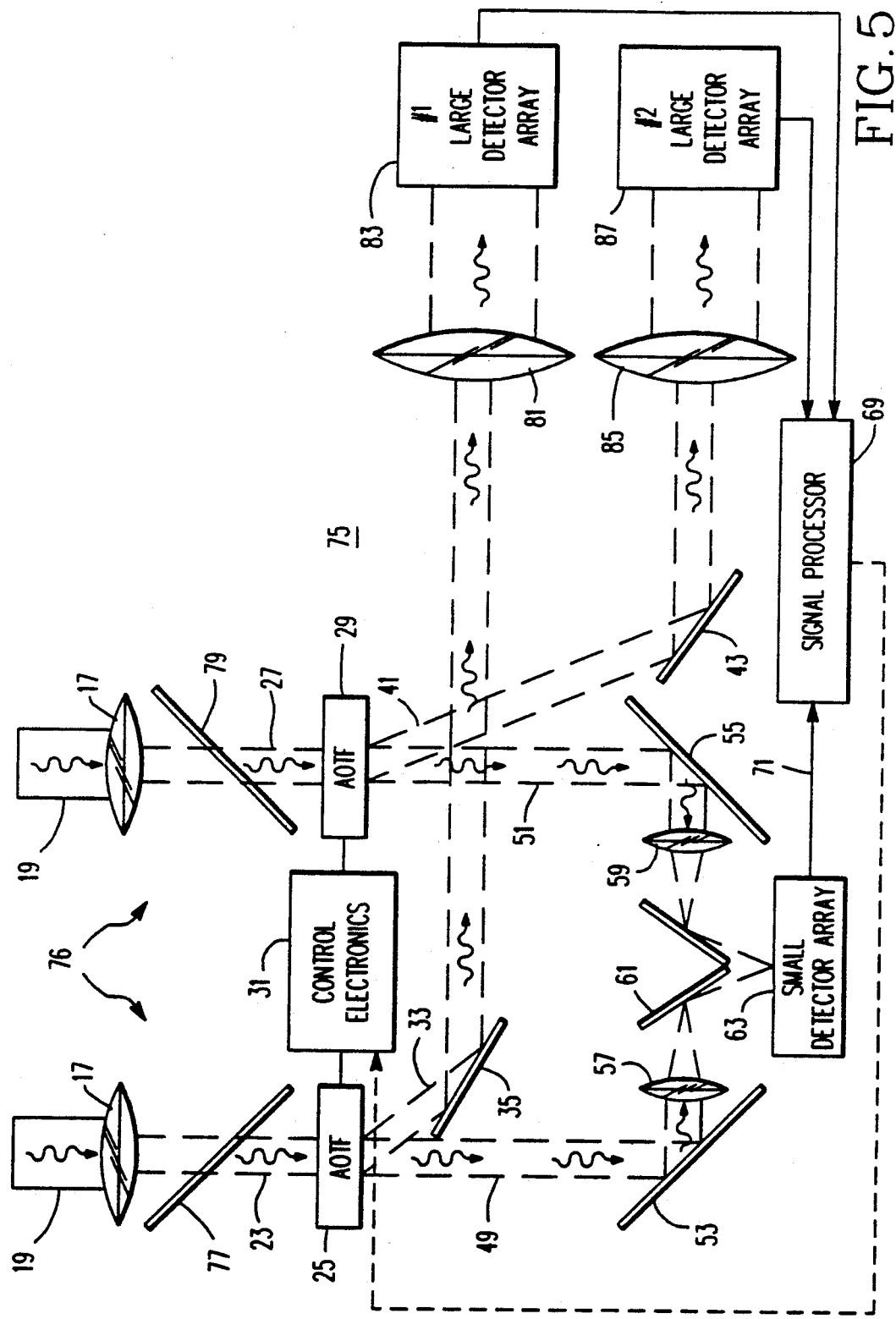
FIG. 5 is a schematic diagram of apparatus in accordance with a second embodiment of the invention.

The basic system configuration shown in FIG. 3 has all the functions required for threat evaluation. However, it is clear that many variations of this basic configuration are possible. FIG. 5 illustrates one such variation. Components in this system 75 similar to those in the receiver 13 are identified by like reference characters. The input section 76 includes separate receiver optics 17 with polarizers 77 and 79, respectively, which orthogonally polarize the beams 23 and 27 directed to the AOTFs 25 and 29. The ordinary polarized diffracted beam 33 is reflected by reflecting mirror 35 to array optics 81 for focusing onto a first large detector array 83. The diffracted extraordinary polarized beam from AOTF 29 is reflected by reflecting mirror 43 to separate array optics 85 for focusing on a second large detector array 87. The separate input optics 17 for each AOTF provides the capability for passive ranging by parallax. In addition, the AOTFs 25 and 29 could be simultaneously operated at different rf frequencies, thereby providing faster spectral information. Simultaneous operation of the two large arrays 83 and 87 increases integration times and simplifies processing by the signal processor 69 to determine polarization-dependent characteristics, as pixel information would not need to be stored for comparisons since the polarized signals would be concurrent rather than sequential.

Instead of enhancing system performance, it may sometimes be more desirable to simplify the system, thereby reducing its size and weight, reducing its cost, and improving its reliability. One simplification would be to eliminate the small array 63 and perform all receiver functions with the large array 47.

Apparatus in accordance with the invention for the detection and identification of optical radiation has many advantages. These advantages include improved reliability in that the system is completely solid state and has no moving parts. In addition the large detector arrays can be maintained below saturation. The system has great versatility since it is computer controlled, wavelengths are randomly addressable, the AOTFs can be operated independently, and adapted control in flight is possible. Apparatus in accordance with the invention also has enhanced performance in that it has independent detection and discrimination, the AOTFs can be rapidly tuned to new wavelengths, clutter can be reduced by differencing polarized images, and the AOTFs have narrow spectral bandwidths.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for detecting and identifying a source of optical radiation, said apparatus comprising:

optical input means generating from incident optical radiation emitted by said source a first input beam having a first polarization and a second input beam having a second polarization orthogonal to said first polarization;

a first acousto-optic tunable filter (AOTF) to which said first input beam is applied as an extraordinary wave and which separates said first input beam into a diffracted ordinary polarized beam of a predetermined narrow bandwidth centered around a center wave length selected by an applied first radio frequency signal of a first selected frequency, and a first broad-band undiffracted beam;

a second acousto-optic tunable filter (AOTF) to which said second input beam is applied as an ordinary wave and which separates said second beam into a diffracted extraordinary polarized beam of a predetermined narrow bandwidth centered around a center wave length selected by an applied second radio frequency signal of a second selected frequency, and a second broad-band undiffracted beam;

first detector means responsive to said first and second broad-band undiffracted beams generating first detector signals;

second detector means responsive to said diffracted ordinary and extraordinary polarized beams generating second detector signals;

control means generating said first and second radio frequency signals; and signal processor means processing said first detector signals to detect the presence of the source of optical radiation, and processing said second detector signals to identify the source of optical radiation.

2. The apparatus of claim 1 wherein said control means varies said first and second frequencies of said first and second radio frequency signals.

3. The apparatus of claim 2 wherein said control means selectively generates said first and second radio frequency signals with said first frequency of said first radio frequency signal different from said frequency of said second radio frequency signal.

4. The apparatus of claim 2 wherein said control means selectively generates said first and second radio frequency signals with said first and second frequencies equal.

5. The apparatus of claim 4 wherein said control means amplitude modulates said first radio frequency signal at a first modulation frequency and said second radio frequency signal at a second modulation frequency different from said first modulation frequency, and wherein said signal processor demodulates said second detector signals to extract signals representative of the diffracted ordinary polarized beam and the diffracted extraordinary polarized beam.

6. The apparatus of claim 2 wherein said control means selectively withholds said first and second radio frequency signals from said first and second AOTFs so that none of said first and second beams are diffracted and said first and second beams pass undiffracted to said first detector means.

7. The apparatus of claim 2 wherein said second detector means comprises a single detector array, and including combining means directing both said diffracted ordinary polarized beam and said diffracted extraordinary polarized beam onto said single detector array.

8. The apparatus of claim 7 wherein said control means generates said first and second radio frequency signals for said first and second AOTFs simultaneously.

9. The apparatus of claim 8 wherein said control means generates said first and second radio frequency signals simultaneously with said first frequency equal to said second frequency.

10. The apparatus of claim 9 wherein said control means amplitude modulates said first radio frequency signal at a first modulation frequency and said second radio frequency signal at a second modulation frequency different from said first modulation frequency, and wherein said signal processor demodulates said second detector signals to extract signals representative of the diffracted ordinary polarized beam and the diffracted extraordinary polarized beam.

11. The apparatus of claim 8 wherein said control means generates said first and second radio frequency signals simultaneously with said first frequency different from said second frequency.

12. The apparatus of claim 7 wherein said control means generates said first and second radio frequency signals for said first and second AOTFs sequentially.

13. The apparatus of claim 7 wherein said control means selectively withholds said first and second radio frequency signals from both AOTFs.

14. The apparatus of claim 2 wherein said second detector means comprises a diffracted ordinary polarized beam detector array generating an ordinary second detector signal and means directing said diffracted ordinary polarized beam onto said ordinary beam detector array, and a diffracted extraordinary polarized beam detector array generating an extraordinary second detector signal and means directing said diffracted extraordinary polarized beam onto said extraordinary detector array, and wherein said signal processor is responsive to both said ordinary second detector signal and said extraordinary second detector signal for identifying said source broad beam optical radiation.

15. The apparatus of claim 2 wherein said first detector means comprises a single detector unit and means directing both undiffracted broad-beam signals onto said single detector unit.

16. The apparatus of claim 15 wherein said detector unit comprises a detector array.

17. The apparatus of claim 16 wherein said detector array comprises a quadrant array.

18. The apparatus of claim 15 wherein said single detector unit comprises a first detector device responsive to a first range of wavelengths in said broad-band optical radiation, and a second detector device responsive to wavelengths in a remaining range of said broad-band optical radiation, and means directing wavelengths in both said first and second undiffracted beams in said first range of wavelengths of said broad-band optical radiation onto said first detector device, and directing the remaining wavelengths of said first and second undiffracted beams onto said second detector device.

19. A method of detecting and identifying a source of optical radiation comprising the steps of:
generating first and second orthogonally polarized input beams from incident light from said source of optical radiation;
separating the first polarized input beam into a first diffracted polarized beam of a first selected wavelength and a first undiffracted polarized beam;
separating the second polarized input beam into a second diffracted polarized beam of a second selected wavelength and a second undiffracted polarized beam;
varying the first and second selected wavelengths;
directing the first and second undiffracted polarized beams to a first detector to generate a first detector signal;
directing the first and second diffracted polarized beams to an imaging detector means to generate a second detector signal; and
using the first detector signal to detect the presence of said source of optical radiation and using the second detector signal for spectral and polarization characterization of said source of optical radiation.

20. The method of claim 19 wherein said step of separating said first and second input beams into diffracted beams and undiffracted beams comprises passing said first and second input beams through separate acousto-optic tunable filters (AOTFs), and applying radio frequency (rf) signals of first and second frequencies respectively to said AOTFs to select said first and second wavelengths, and wherein said first and second diffracted beams are both applied to a single imaging detector array.

21. The method of claim 20 wherein said first and second rf frequency signals are the same frequency.

22. The method of claim 20 comprising simultaneously applying said first and second rf signals to said first and second AOTFs.

23. The method of claim 22 including amplitude modulating said first and second rf signals at separate modulation frequencies and demodulating the second detector signal to extract first and second polarization signals.

24. The method claim 22 including switching from simultaneous application of said first and second rf signals to said first and second AOTFs to sequential application of said rf signals to said first and second AOTFs when the second detector signal reaches a predetermined level.

25. The method of claim 20 including withholding said rf signals from said AOTFs until said first detector signal reaches a threshold level.

26. The method of claim 20 including sequentially applying said rf signals to said first and second AOTFs.

* * * * *